Oct. 21, 1941.  V. GENTILE, JR  2,260,019

FLOW TUBE

Filed July 29, 1940

INVENTOR
Vincent Gentile, Jr.
BY Joseph F. Padlon
ATTORNEY

Patented Oct. 21, 1941

2,260,019

UNITED STATES PATENT OFFICE 2,260,019

FLOW TUBE

Vincent Gentile, Jr., Brooklyn, N. Y.

Application July 29, 1940, Serial No. 348,189

1 Claim. (Cl. 73—212)

This invention relates to a flow tube. More particularly it refers to an integral, compact flow tube adapted for use as an insertable section of a pipe line.

In the usual arrangement of pipe lines through which large volumes of liquids pass, it is of advantage to determine at certain points along the pipe line the velocity and amount of liquid flowing per unit of time. As a result, Venturi tubes have been provided for this purpose. However, because of their length, it oftentimes is difficult to install such tubes in limited spaces in a pipe line system. In the case of large pipe diameters, a Venturi tube of excessive length would be required. For example, a sixty-six inch diameter standard Venturi tube is about twenty-six feet long, thus making it difficult and sometimes practically impossible to install in a limited space. It is apparent, therefore, that the Venturi tube is not well adapted for installations in cramped areas, such as around or in pumping stations.

With a view to obviate the above and other disadvantages of measuring tubes as used in the prior art, it is one of the objects of the present invention to provide a compact pipe section or unit of any desirable length having a novel arrangement of pressure and suction nozzles and adapted for easy installation in a pipe line system.

It is a further object of the invention to provide certain improvements in fluid flow measuring apparatus as above characterized, in which a group of nozzles is arranged in circumferential spaced apart relation and in a common flow plane axially of the pipe line with the nozzle bores having end portions located in closely adjacent parallel relation to the inner surface of the pipe section, and the interior of said pipe section being otherwise unobstructed so as to minimize the effect of turbulence upon accurate measurement of the velocity flow of fluid through the pipe line.

Other objects and advantageous features of my invention will become apparent from the detailed description hereinafter following.

A preferred embodiment of the invention includes a flanged pipe section provided with a plurality of pressure openings and nozzles, the latter being disposed on the interior of said section and preferably arranged in tandem for measuring in a given pipe, duct or conduit, the velocity of the flow, or quantity flowing per unit time of any fluid; such as, water, oil, steam, air and the like.

Figure 1:
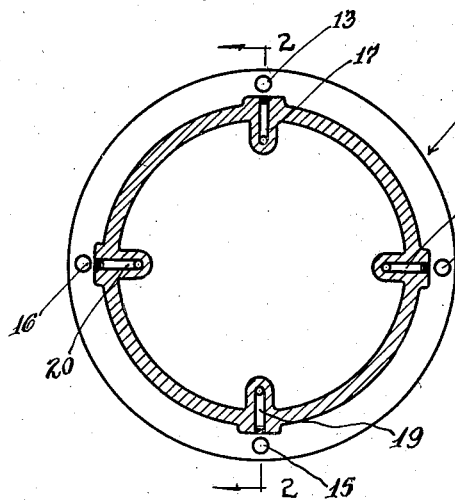
Figure 2:
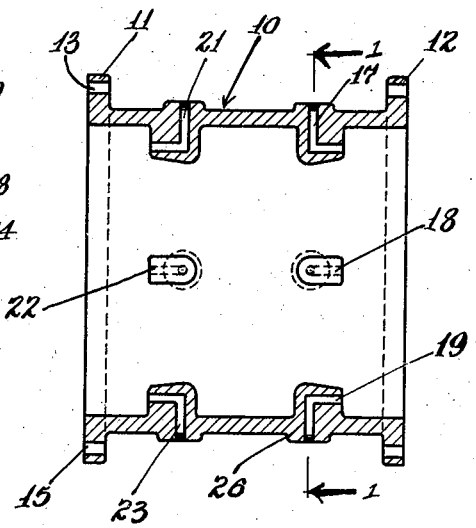
Figure 3:
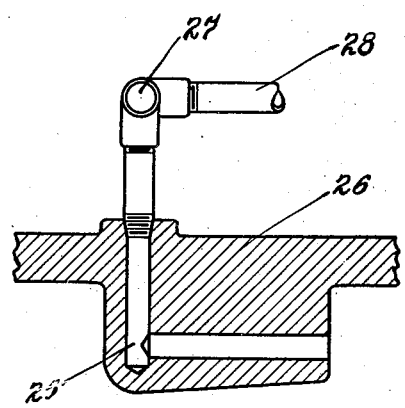
Figure 4:
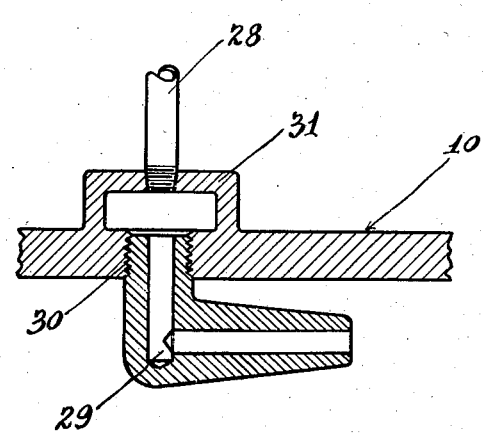

In the accompanying drawing:

Fig. 1 is a cross sectional end view of a preferred embodiment taken on line 1—1 of Fig. 2, Fig. 2 is a longitudinal sectional view, taken on line 2—2 of Fig. 1, Fig. 3 is an enlarged fragmental detail sectional view of a part of my invention, and Fig. 4 is an enlarged detail sectional view of a modification.

Before describing the invention as embodied in the drawing, the principle underlying the same is here enunciated.

The invention utilizes the principle of velocity distribution in a closed conduit. While the velocity varies from zero at the wall of the conduit to a maximum at the center, the velocity gradient at the wall is so steep that the velocity jumps abruptly from zero to a value about 75 to 85% of the average velocity throughout the cross-section. This rapid change which holds for turbulent flow conditions, i. e., Reynolds numbers above the critical value which is the condition usually encountered in actual flow measurements, is so pronounced that it has led some experimenters to erroneously conclude that there exists a definite velocity at the walls, when actually the wall velocity for any condition of flow must be zero.

Referring now to the drawing in which like reference characters relate to like parts throughout, a flow tube unit 10 is provided, made of any desirable length and diameter having flanged terminal portions 11 and 12. Said terminal portions have spaced openings 13, 14, 15 and 16 at spaced intervals thereon, adapted to permit connection onto a pipe or conduit system.

Intermediate said flanged portions, 11 and 12, there is disposed a set of nozzles 17, 18, 19, 20 and a corresponding set of respective nozzles three of which are indicated at 21, 22, 23. These tandem sets as shown in Figs. 2 and 3 are integral with unit 10, and in longitudinally spaced apart relation along the interior of the unit, whereby one set of nozzles points upstream and the other set points downstream in the pipe or conduit system. It is to be noted that the longitudinal distance between the upstream and downstream sets is not material and may be made as small as desired. Furthermore, the bore 25, as shown in each nozzle, is preferably disposed perpendicular to the wall thickness 26 of the unit, and then extends longitudinally of and adjacent to the interior of said unit as shown in Fig. 3. The nozzles of each group may be connected to a circumferential pipe 27 connected on the outer wall of the unit, whereby the average pressure obtained may be carried by suitable piping 28 in connection therewith to a meter or other registering means, not shown.

It will be noted that the individual nozzles are quite small relative to the internal diameter of the pipe section and that their bores or passages have their end portions opening into said pipe section located very closely adjacent to the inner surface of the pipe wall and, therefore, immediately contiguous to the zone of zero velocity pressure. It is further to be noted that the internal area of the pipe section is otherwise unobstructed than by these small nozzles and the surface of the pipe wall between said nozzles is smooth and unbroken. This arrangement of the nozzles reduces turbulence to a minimum and insures a high degree of accuracy in the operation of the meter or other velocity pressure measuring unit.

In Fig. 4, a modified form of my embodiment having an independently formed nozzle 29 is shown as separately made and then mounted into tapped opening 30. It is to be noted that the unit 10, as shown in this figure, is provided with an integral circumferential pressure ring 31 to which piping 28 is connected for registering means.

In the operation of the unit as disclosed, it is preferably intended to use two groups of nozzles, one pointing upstream and the other pointing downstream.

If two sets of nozzles are used there will be impressed on the upstream group a total head equal to the static head plus the velocity head, or calling this head H, there is obtained $$H = h + \frac{V^2}{2g}$$

where $h$ = static head, and $\frac{V^2}{2g}$ = the velocity head.

On the downstream group of nozzles, there will be impressed a total head equal to the static head minus the velocity head, or calling this pressure H', there is obtained $$H' = h - \frac{V^2}{2g}$$

The differential head that would be recorded in this case would be $$H - H' = h + \frac{V^2}{2g} - \left(h - \frac{V^2}{2g}\right) = 2\frac{V^2}{2g}$$

This is equal to two velocity heads at the nozzles and by suitable calibration of the metering device is to be converted to average velocity or quantity flowing per unit of time.

From the foregoing description taken in connection with the accompanying drawing, it will be noted that I have provided a flow tube device which can be made very short and of any desired size. It can be easily fabricated and machined and readily installed in the most advantageous location of a pipe line both as regards accessibility and steady flow conditions. This device as made in accordance with my invention will immediately help indicate a reversal of flow which information is invaluable in certain types of pumping stations, while the Venturi tube as now used will show a positive reading even when the flow of fluid in the pipe system is in the opposite direction. Furthermore, the pressure drop across the embodiment described herein would be negligible and for properly streamlined nozzles would hardly be measurable. The pressure drop in the standard Venturi tube varies from 6 to 10% of the velocity head at the throat, representing a loss of approximately 13 to 23% of the velocity head in the main stream. Under certain conditions this becomes an appreciable loss of power, which loss can be avoided by means of the present invention.

While preferred embodiments of my invention have been described in connection with the accompanying drawing, it is to be understood that any modifications as to form, use, arrangement of parts and materials may be made by me without departing from the spirit and scope of my invention.

I claim:

In fluid flow measuring apparatus, a pipe section having a flow passage of uniform diameter, two longitudinally spaced apart groups of nozzles opening at one of their ends through the wall of said pipe section, the nozzles in each group being circumferentially spaced apart and the bores of said nozzles having their other end portions opening within the pipe section in a common flow plane, and said bores of the nozzles in the respective groups extending longitudinally in relatively opposite directions and having their open ends disposed closely adjacent to the inner surfaces of the wall of said pipe section, said wall surface and the internal area of the pipe section being otherwise uninterrupted.

VINCENT GENTILE, Jr.